United States Patent
Shi et al.

(10) Patent No.: US 12,376,035 B2
(45) Date of Patent: Jul. 29, 2025

(54) METHOD AND APPARATUS FOR WUS DETECTION

(71) Applicant: Lenovo (Beijing) Ltd., Beijing (CN)

(72) Inventors: Jie Shi, Haidian District (CN); Zhi Yan, Xicheng District (CN); Lianhai Wu, Chaoyang (CN); Yingying Li, Haidian District (CN); Haiming Wang, Xicheng District (CN); Jing Han, Chaoyang District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 263 days.

(21) Appl. No.: 17/775,527

(22) PCT Filed: Nov. 15, 2019

(86) PCT No.: PCT/CN2019/119004
§ 371 (c)(1),
(2) Date: May 9, 2022

(87) PCT Pub. No.: WO2021/092958
PCT Pub. Date: May 20, 2021

(65) Prior Publication Data
US 2022/0400442 A1    Dec. 15, 2022

(51) Int. Cl.
*H04W 52/02* (2009.01)

(52) U.S. Cl.
CPC ... *H04W 52/0235* (2013.01); *H04W 52/0216* (2013.01); *H04W 52/0219* (2013.01);
(Continued)

(58) Field of Classification Search
CPC ......... H04W 52/0235; H04W 52/0216; H04W 52/0219; H04W 52/0229; H04W 52/028; Y02D 30/70
See application file for complete search history.

(56) References Cited

U.S. PATENT DOCUMENTS

| | | | |
|---|---|---|---|
| 2019/0090190 A1 | 3/2019 | Liu et al. | |
| 2019/0159128 A1 | 5/2019 | Lin et al. | |

(Continued)

FOREIGN PATENT DOCUMENTS

| | | | |
|---|---|---|---|
| CN | 102625253 A | 8/2012 | |
| CN | 107018496 A | 8/2017 | |

(Continued)

OTHER PUBLICATIONS 19952732.6 , "Communication Pursuant to Rule 164(1) EPC", EP Application No. 19952732.6, Jun. 27, 2023, 14 pages.

(Continued)

*Primary Examiner* — Omer S Mian
(74) *Attorney, Agent, or Firm* — FIG. 1 Patents

(57) ABSTRACT

Embodiments of the present application are related to a method and apparatus for wake up signal (WUS) detection. An embodiment of the present application provides a method. The method may include: receiving WUS configuration information including user equipment (UE) grouping information and WUS alternating information; determining an initial WUS sequence based on the UE grouping information; and monitoring a WUS sequence based on the initial WUS sequence and the WUS alternating information.

19 Claims, 9 Drawing Sheets

(52) U.S. Cl.
CPC ..... *H04W 52/0229* (2013.01); *H04W 52/028* (2013.01); *Y02D 30/70* (2020.08)

(56) References Cited

U.S. PATENT DOCUMENTS

| | | | |
|---|---|---|---|
| 2022/0124620 A1* | 4/2022 | Liu | H04L 5/0037 |
| 2022/0167273 A1* | 5/2022 | Wang | H04W 52/028 |

FOREIGN PATENT DOCUMENTS

| | | | |
|---|---|---|---|
| CN | 110198557 | A | 9/2019 |
| WO | 2018204799 | A1 | 11/2018 |
| WO | 2019033112 | A1 | 2/2019 |
| WO | 2019055417 | A1 | 3/2019 |

OTHER PUBLICATIONS

Qualcomm Incorporated, "UE-group wake-up signal for MTC", 3GPP TSG-RAN WG1 #99, R1-1912677, Reno, NV, USA [retrieved Jun. 27, 2023]. Retrieved from the Internet <https://www.3gpp.org/ftp/tsg_ran/WG1_RL1/TSGR1_99/Docs>, Nov. 2019, 8 pages.

19952732.6, "Extended European Search Report", EP Application No. 19952732.6, Sep. 28, 2023, 12 pages.

"International Search Report and Written Opinion", PCT Application No. PCT/CN2019/119004, Aug. 21, 2020, 8 pages.

PCT/CN2019/119004, "International Preliminary Report on Patentability", PCT Application PCT/CN2019/119004, May 27, 2022, 6 pages.

"Foreign Office Action", CN Application No. 201980102028.7, Jan. 16, 2025, 20 pages.

201980102028.7, "Foreign Office Action", CN Application No. 201980102028.7, Aug. 31, 2024, 22 pages.

Nokia, "UE-group wake-up signal for NB-IoT", 3GPP TSG RAN WG1 Meeting #96bis, R1-1904176, Xi'an, China, Apr. 2019, 5 pages.

"Foreign Office Action", CN Application No. 201980102028.7, Mar. 31, 2025, 32 pages.

\* cited by examiner

METHOD AND APPARATUS FOR WUS DETECTION

TECHNICAL FIELD

Embodiments of the present application generally relate to wireless communication technology, and more specifically relates to a method and apparatus for wake up signal (WUS) detection in narrow band internet of things (NB-IoT) technology.

BACKGROUND OF THE INVENTION

In the NB-IoT technology, a WUS mechanism is introduced for power saving in long term evolution (LTE) release (R) 15, wherein a WUS indicates whether there is a paging process in a pre-defined paging occasion (PO).

Specifically, when the WUS mechanism is disabled, a UE always monitors paging messages on POs. When the WUS mechanism is enabled, the UE monitors the following possible paging messages in POs in response to the UE detecting a WUS, so that physical downlink control channel (PDCCH) blind detection can be performed. On the other hand, when the WUS mechanism is enabled, the UE will not monitor the following paging messages in POs in response to the UE not detecting any WUS.

However, due to complicated factors in a wireless communication network, the WUS mechanism may not work well under some conditions in the NB-IoT technology and still need further improvement.

BRIEF SUMMARY OF THE INVENTION

One objective of the embodiments of the present application is to provide a solution of WUS detection in the NB-IoT technology.

An embodiment of the present application provides a method. The method may include: receiving wake up signal (WUS) configuration information including user equipment (UE) grouping information and WUS alternating information; determining an initial WUS sequence based on the UE grouping information; and monitoring a WUS sequence based on the initial WUS sequence and the WUS alternating information.

According to another embodiment of the present application, the method may include: determining WUS configuration information including paging probability threshold information and WUS alternating information; and transmitting the WUS configuration information for WUS.

According to yet another embodiment of the present application, the method may include: determining user equipment (UE) distribution information, wherein the UE distribution information to indicates whether a mobility management entity (MME) will page a UE not configured with paging probability information or a UE only for UE-ID based grouping, or determining user equipment (UE) distribution information is per gap type, per carrier or per gap type and carrier; and transmitting the UE distribution information.

Yet another embodiment of the present application provides an apparatus. The apparatus include a non-transitory computer-readable medium having stored thereon computer-executable instructions; at least one receiving circuitry; at least one transmitting circuitry; and a processor coupled to the non-transitory computer-readable medium, the receiving circuitry and the transmitting circuitry, wherein the computer-executable instructions cause the processor to implement a method.

Some embodiments of the present application propose a mechanism of WUS sequence alternating, which can reduce the unfairness for UEs monitoring WUS sequences on different WUS resources in time domain. In addition, some embodiments of the present application propose technical solutions of paging probability based grouping, which may include enhancing UE distribution information and/or paging probability threshold information. Accordingly, embodiments of the present application can improve WUS detection in NB-IoT technology, and facilitate the implement of NR.

BRIEF DESCRIPTION OF THE DRAWINGS

In order to describe the manner in which advantages and features of the present application can be obtained, a description of the present application is rendered by reference to specific embodiments thereof which are illustrated in the appended figures. These figures depict only example embodiments of the present application and are not therefore to be considered as limiting of its scope.

DETAILED DESCRIPTION OF THE INVENTION

Figure 1A:
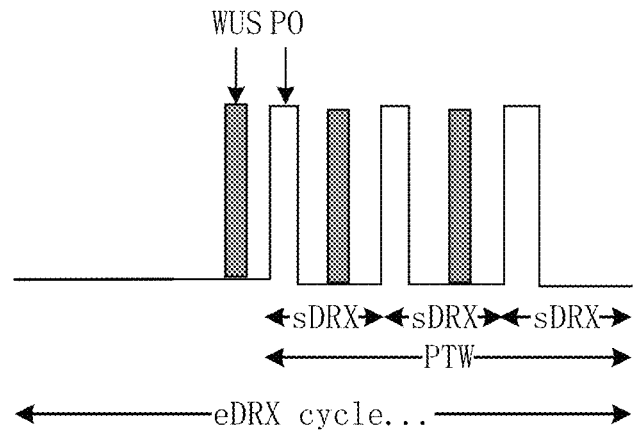
FIG. 1A illustrates a block diagram of mapping WUSs to POs according to an example embodiment of the present application.

The detailed description of the appended figures is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Embodiments of the present application provide methods and apparatus for grouping UEs in the NB-IoT technology. To facilitate understanding, embodiments of the present application are provided under specific network architecture and service scenarios, such as 3GPP 5G NR (new radio), 3GPP LTE R15 and onwards. Persons skilled in the art are well-aware that, with developments of network architecture and new service scenarios, the embodiments in the present application are also applicable to similar technical problems.

An example wireless communication system may include UEs, and a base station (BS). The wireless communication system may further include Mobility Management Entities (MMEs). Persons skilled in the art well know that the number of UEs, BSs, and MMEs in the wireless communication system may vary.

The UEs may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the UEs may include a portable wireless communication device, a smart phone, a cellular telephone, a flip phone, a device having a subscriber identity module, a personal computer, a selective call receiver, or any other device that is capable of sending and receiving communication signals on a wireless network. In another embodiment of the present application, the UEs may include wearable devices, such as smart watches, fitness bands, optical head-mounted displays, or the like.

Moreover, the UEs may be referred to as subscriber units, mobiles, mobile stations, users, terminals, mobile terminals, wireless terminals, fixed terminals, subscriber stations, UE, user terminals, a device, or by other terminology used in the art. The UEs may communicate directly with a BS via uplink or downlink communication signals.

The BSs may be distributed over a geographic region. In certain embodiments of the present application, a BS may also be referred to as an access point, an access terminal, a base, a base station, a macro cell, a Node-B, an enhanced Node B (eNB), a gNB, a Home Node-B, a relay node, a device, or by any other terminology used in the art. The BSs are generally part of a radio access network that may include one or more controllers communicably coupled to one or more corresponding BSs.

The BSs may be communicatively coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicatively coupled to a mobility management entity (MME), a serving gateway (SGW), and/or a packet data network gateway (PGW).

The BSs may serve a number of UEs within a serving area, for example, a cell or a cell sector via a wireless communication link. The BSs may directly communicate with one or more of the UEs via communication signals. For example, a BS may serve UEs within a macro cell.

The BSs transmits downlink communication signals to serve the UEs in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the UEs and the BSs.

The wireless communication system is compliant with any type of network that is capable of sending and receiving wireless communication signals. For example, the wireless communication system is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system is compliant with the long-term evolution (LTE) of the 3GPP protocol, wherein the BS transmits using an orthogonal frequency division multiplexing (OFDM) modulation scheme on the DL and the UEs transmit on the UL using a single-carrier frequency division multiple access (SC-FDMA) scheme or OFDM scheme. More generally, however, the wireless communication system may implement some other open or proprietary communication protocol, for example, WiMAX, among other protocols.

In other embodiments, the BS may communicate using other communication protocols, such as the IEEE 802.11 family of wireless communication protocols. Further, in an embodiment, the BS may communicate over licensed spectrum, while in other embodiments the BS may communicate over unlicensed spectrum. The present application is not intended to be limited to the implementation of any particular wireless communication system architecture or protocol. In another embodiment, the BS may communicate with UEs 101 using the 3GPP 5G protocols.

According to embodiments of the present application, a WUS mechanism may be used for power saving in monitoring paging messages in POs. For example, in response to accessing a wireless communication network, the UE may read wireless communication system information to identify an enabled/disabled status of a WUS mechanism. In response to the WUS mechanism being enabled, the UE may detect a WUS, and then monitor a paging message based on the detected WUS. POs may be POs in a discontinuous reception (DRX) mode/extended DRX (eDRX) mode, or may be dedicated POs distributed in the DRX mode/eDRX mode. In one eDRX cycle of the eDRX mode, one paging transmission window (PTW) includes one or more POs. There may be multiple short DRXs (sDRXs) in one PTW. In response to one PTW including multiple sDRXs, the number of PO may be countered based on an sDRX cycle. Moreover, according to LTE R15, the relation of WUS to PO could be 1-to-N, and N could be 1, 2, or 4. That is, one WUS can be mapped to one PO as shown in FIGS. 1A and 1B, or mapped to multiple POs as shown in FIGS. 2A and 2B.

Figure 2A:
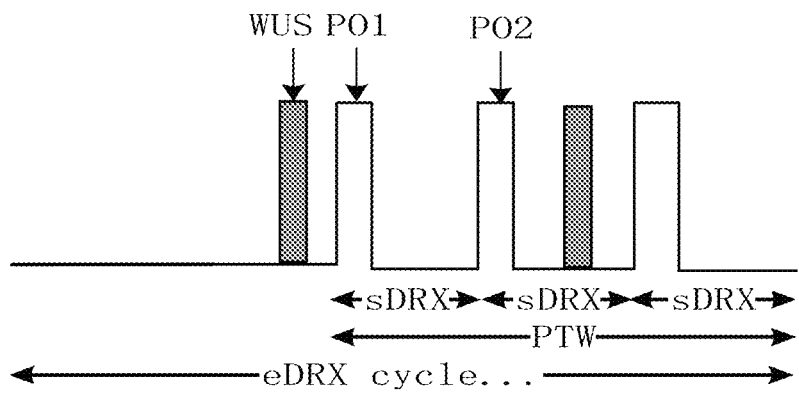
FIG. 2A illustrates a block diagram of mapping WUSs to POs according to yet another example embodiment of the present application.
Figure 2B:
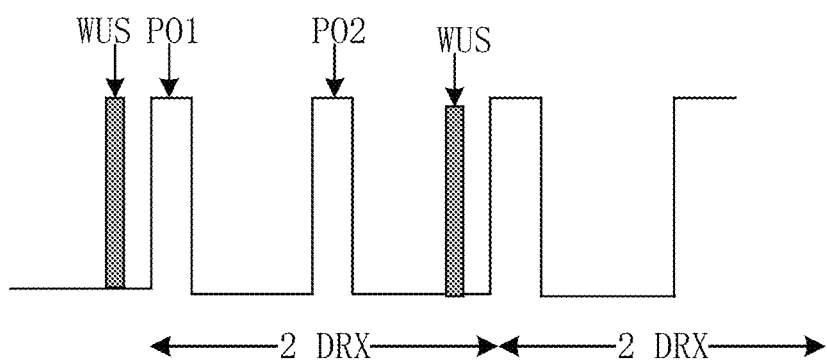
FIG. 2B illustrates a block diagram of mapping WUSs to POs according to a further example embodiment of the present application.

Specifically, FIG. 1A illustrates a block diagram of mapping WUSs to POs according to an example embodiment of the present application, wherein one WUS is mapped to one PO in an eDRX mode.

As shown in FIG. 1A, in one eDRX cycle of the eDRX mode, there are three sDRXs in one PTW, and each WUS is applied to each PO in one sDRX of the PTW. Persons skilled in the art well know that one PTW of the eDRX mode may include different numbers of sDRXs or POs. Thus, the number of sDRXs or POs and the number of WUSs mapped to POs may be different from this embodiment of the present application.

Figure 1B:
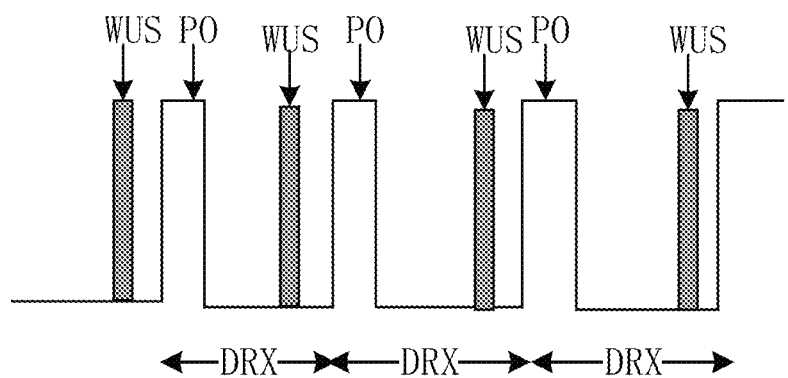
FIG. 1B illustrates a block diagram of mapping WUSs to POs according to another example embodiment of the present application.

FIG. 1B illustrates a block diagram of mapping WUSs to POs according to another example embodiment of the present application, wherein one WUS is mapped to one PO in a DRX mode. As shown in FIG. 1B, each WUS is applied to each PO in one DRX cycle in the DRX mode.

FIG. 2A illustrates a block diagram of mapping WUSs to PTWs according to yet another example embodiment of the present application, wherein one WUS is mapped to multiple POs in an eDRX mode.

As shown in FIG. 2A, in one eDRX cycle of the eDRX mode, there are three sDRXs in one PTW. Each sDRX includes one PO, and one WUS is applied to two POs, i.e., PO1 and PO2 in one PTW of the eDRX mode. In another embodiment of the present application, one WUS may be applied to all POs in one PTW. In addition, persons skilled in the art well know that one PTW of the eDRX mode may include different numbers of sDRXs or POs. Thus, the number of sDRXs or POs and the number of WUSs applied to POs may be various in different embodiments of the present application.

FIG. 2B illustrates a block diagram of mapping WUSs to POs according to a further example embodiment of the present application, wherein one WUS may be mapped to multiple POs in a DRX mode. As shown in FIG. 2B, a one WUS is applied to two POs in 2 DRX cycles. Persons skilled in the art well know that, in other embodiments of the present application, one WUS may be applied to more than two DRX cycles in the DRX mode, for example, one WUS may be applied to three or more POs in the DRX mode.

However, LTE R15 also specifies that multiple UEs, e.g., UEs paged in the same PO will be associated with the same WUS. For example, ten UEs paged in the same PO will detect the same WUS. In the case that a specific UE of the ten UEs will be paged by a base station, the WUS for this specific UE will be sent to all of the ten UEs from the network side. That is, all of the ten UEs may also receive this WUS for the specific UE. Accordingly, although no paging information for other nine UEs will be received, the other nine UEs have to monitor the paging due to receiving a WUS. Apparently, the purpose for power saving in monitoring paging messages in POs cannot be achieved in this case.

To reduce the probability of false wake up, group wake up signal (GWUS) is introduced to support grouping UEs in the WUS mechanism in 5G new radio R16. Specifically, multiple UEs can be divided into different groups, and a specific WUS signal is associated with a specific group of UEs and indicates the PO(s) associated with the specific group of UEs. The specific WUS sequence can also be associated with one or more groups of UEs. In some embodiments of the present application, the specific WUS can be named as "common WUS." When the common WUS is transmitted from the BS, all of the UEs in the same WUS resource will wake up to monitor the following PO(s). According to some embodiments of the present application, the WUS sequences may include the common WUS. According to some other embodiments of the present application, the WUS sequences may not include the common WUS. The number of UE groups can be configured by a base station and can be broadcasted in system information block (SIB). During a paging process, only UE(s) within the specific group may monitor a paging message in the PO(s) based on the detected specific WUS, while other UEs not included in this specific group will not monitor the paging message in the PO(s) based on the specific WUS. Accordingly, during the paging process, more power of UEs could be saved in the WUS mechanism applying the GWUS scheme than that using the legacy R15 WUS scheme.

Figure 3A:
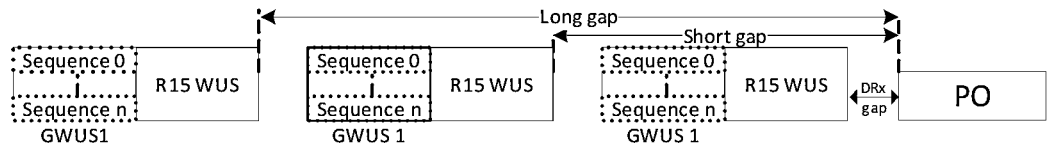
FIGS. 3A and 3B illustrate a block diagram of the configuration of one GWUS resource according to some embodiments of the present application.
Figure 3B:
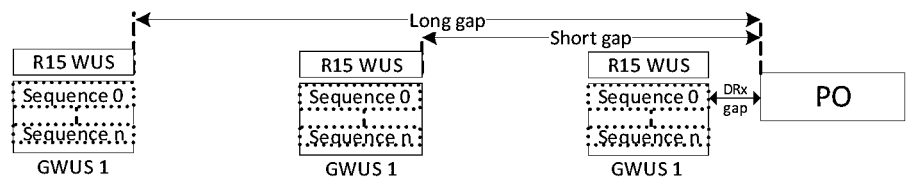
Figure 3C:
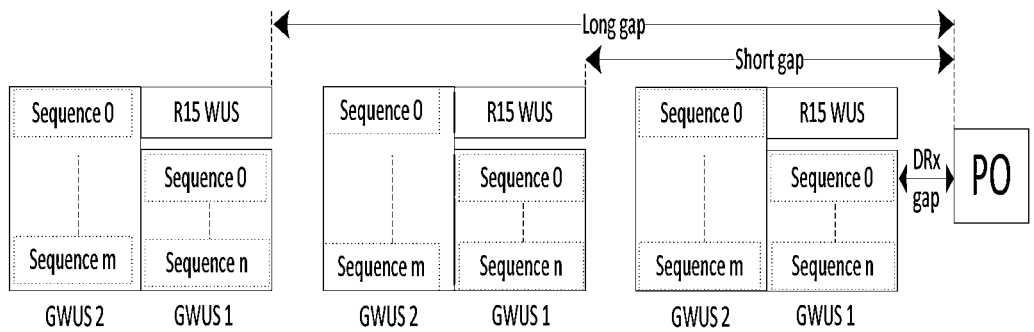
FIG. 3C illustrates a block diagram of the configuration of two GWUS resources according to some embodiments of the present application.

FIGS. 3A-3C respectively illustrate a block diagram of WUS resource configuration for GWUS according to some embodiments of the present application.

Specifically, FIG. 3A illustrates a block diagram of the configuration of one GWUS resource according to some embodiments of the present application, wherein the resource for GWUS, i.e., GWUS 1 and the R15 WUS (i.e., legacy WUS hereafter the same) resource are multiplexed based on time division multiplexing. GWUS resource is the resource for GWUS. In the resource for GWUS, there can be a group of WUS sequences, e.g., sequence 0 to sequence n before the legacy R15 WUS resource in time domain. Each WUS sequence is associated with at least one UE group. According to some embodiments of the present application, there can be 8 WUS sequences code-multiplexed on a WUS resource.

FIG. 3B illustrates a block diagram of the configuration of one GWUS resource according to some embodiments of the present application, wherein the GWUS resource, i.e., GWUS 1 and the legacy WUS resource are multiplexed based on code division multiplexing. The GWUS resource can be occupied by a group of WUS sequences e.g., sequence 0 to sequence n overlapping with the legacy WUS resource in time domain and is multiplexed with the legacy WUS resource in code domain. Each WUS sequence is associated with at least one UE group.

FIG. 3C illustrates a block diagram of the configuration of two GWUS resources according to some embodiments of the present application, wherein one GWUS resource, i.e., GWUS 1 is a group of WUS sequences e.g., sequence 0 to sequence n before the legacy WUS, while the other GWUS resource, GWUS 2 is a group of WUS sequences e.g., sequence 0 to sequence m overlapping with the legacy WUS in time domain and is multiplexed with the legacy WUS resource in code domain. Each WUS sequence is associated with at least one UE group.

At least for the group WUS in the same WUS resource, legacy WUSs with phase shifts is designed for a group of WUS sequence according to w_(group)(m')=w(m') exp(j2πgm/G), wherein w(m') is the legacy WUS, G=132, g=14*(UE_group_index+1), 0≤UE_group_index≤7. Similar to a legacy WUS, a GWUS resource can also be associated with N (one of {1, 2, 4}) POs in a PTW. Once a UE detects its WUS, it will monitor the following N POs. For the same PO, a UE can detect the corresponding WUS/GWUS by DRX gap, or by eDRX gap. All gaps (or offset, hereafter the same) use the same GWUS configuration on the number of UE groups and WUS resource allocation. The eDRX gap could include a short gap or a long gap as shown in FIGS. 3A-3C. In addition, the eDRX gap may be configured individually in the case it is separated from the DRX gap. A UE can apply the gap type based on the DRX or eDRX configuration and its capability on grouping rules for WUS.

Since a UE is associated with a specific WUS sequence on a specific WUS resource, e.g., Sequence 0 on GWUS 2 in GWUS; a UE in one UE group may always monitor one WUS sequence on GWUS 1, while another UE in another UE group may always monitor one WUS sequence in GWUS2. Apparently, the UE monitoring WUS sequence on GWUS 1 needs more time to wake up to monitor the associated PO, which means more power consumption and is unfair for the UE monitoring WUS sequence on GWUS1. Thus, a mechanism of UE group alternating or WUS sequence alternating between configured WUS resources in different locations in time domain, e.g., GWUS1 and GWUS2, is proposed to pursue the fairness of UEs in WUS detection.

In the following embodiments, the term "WUS" applied can mean the GWUS. The GWUS could include the Release 15 WUS.

Figure 4:
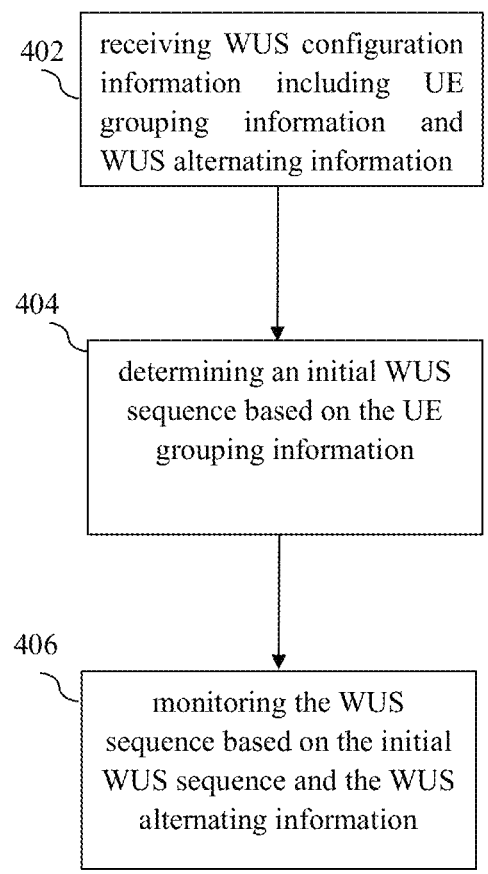
FIG. 4 illustrates a flowchart of a method for WUS detection according to some embodiments of the present application.

FIG. 4 illustrates a flowchart of a method for WUS detection according to some embodiments of the present application, which can be performed in a UE. Particularly, the method shown in FIG. 4 relates to a mechanism of WUS sequence alternating, including directly WUS sequence alternating and indirectly WUS sequence alternating by alternating WUS resources. The WUS resource could be time-multiplexed for NB-IoT, and time-multiplexed and/or frequency-multiplexed for enhanced Machine Type Communication (eMTC).

As shown in FIG. 4, according to some embodiments of the present application, a UE may receive WUS configuration information from the network side, e.g., a BS in step 402. The WUS configuration information may include UE grouping information. Based on the received UE grouping information, the UE can determine to which UE group it belongs, and accordingly determine which WUS sequence it should initially monitor according to the mapping of WUS sequences and UE group IDs. That is, based on the received UE grouping information, the UE can compute an initial WUS sequence on a specific WUS resource in step 404. The initial WUS sequence may be also correspond to the initial UE group ID based on a grouping rule.

In some embodiments of the present application, the mapping of WUS sequences and UE group IDs is shown in an exemplary table, i.e., Table 1. In Table 1, there are eight UE groups with UE group IDs 0-7, wherein the common WUS will be monitored by all UEs in the eight UE groups. UE group IDs 0-7 respectively correspond to WUS sequences 0-7.

TABLE 1

| WUS sequence | UE group |
|---|---|
| 0 | 0 |
| 1 | 1 |
| 2 | 2 |
| 3 | 3 |
| 4 | 4 |
| 5 | 5 |
| 6 | 6 |
| 7 | 7 |
| Common WUS | 0-7 |

The WUS configuration information may also include WUS alternating information. According to some embodiments of the present application, the WUS alternating information may include size information, wherein the size information may indicate a number of WUS sequences alternating in a dedicated location in time domain or a number of WUS resources alternating in a dedicated location in time domain.

In some embodiments of the present application, to alternate the WUS sequences, the size information may include a value configured by the network side from a value range. For example, the value range may be (0, 1, 2, 3, 4, 5, 6, 7, 8), (0, 1, 9), or (0, 1, 10) dependent on different embodiments of the present application. In some other embodiments of the present application, to alternate the WUS sequences, the size information may include the minimum of $(\Sigma_{j=1}^{j=J} n_{i,j}, \Sigma_{j'=1}^{j'=J'} n_{i',j'})$. Specifically, $n_{i,j}$ is the number of WUS sequences on a WUS resource with a time domain and frequency domain value, i is a time resource index, j is a frequency resource index. Similarly, $n_{i',j'}$ is the number of WUS sequences at a WUS resource with a time domain and frequency domain value, i' is a time resource index, j' is a frequency resource index. J and J' are the respective numbers of the WUS resources participating in UE grouping at the same location in time domain. In the case that the number of the WUS resources at the same location in time domain is zero, $n_{i,j}$ and $n_{i',j'}$ will also be zero. In some yet other embodiments of the present application, to alternate the WUS sequences, the size information may be a default value equivalent to 1.

According to some embodiments of the present application, the size information may include a value configured by the network side from a value range, so that the WUS sequences can be alternated by alternating the WUS resources. For example, the value range can be (0, 1, 2, 3, 4). According to some other embodiments of the present application, the size information may include a value of the minimum of (m1, m2) to alternate WUS resources. Specifically, m1 is the total number of WUS resources at a first location in time domain and m2 is the total number of WUS resources at a second location in time domain. The first location and the second location are different in the time domain for the same gap type. According to some yet other embodiments of the present application, to alternating the WUS resources, the size information may be a default value equivalent to 1.

In some embodiments of the present application, the size information may indicate a value equivalent to zero, which means there is no WUS sequence alternating or WUS resource alternating.

Then, the UE can monitor the WUS sequence associated based on the initial WUS sequence and the WUS alternating information in step 406.

Figure 5A:
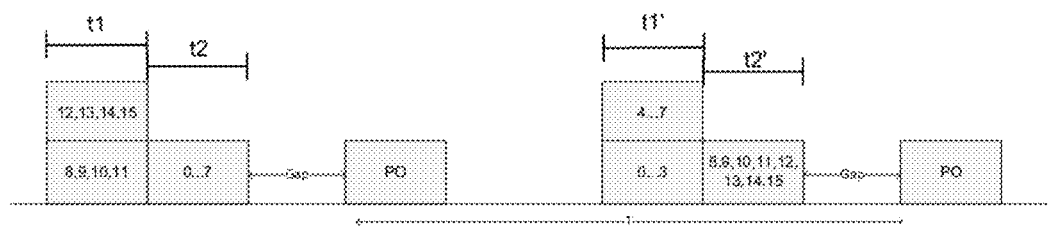
FIGS. 5A and 5B respectively illustrate an exemplary alternation of WUS sequences according to some embodiments of the present application.
Figure 5B:
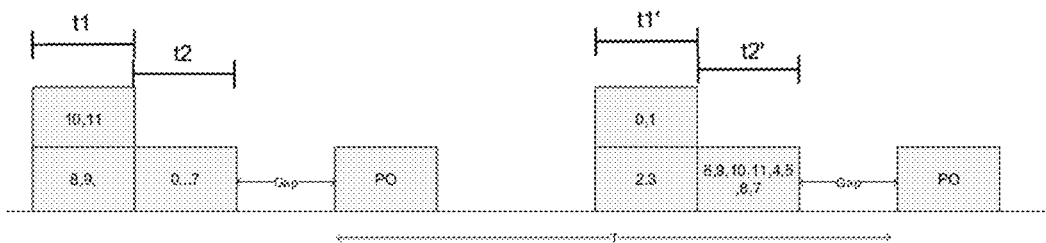

FIGS. 5A and 5B respectively illustrate an exemplary alternation of WUS sequences according to some embodiments of the present application, wherein the WUS sequences can alternate in a dedicated location in time domain. Difference between FIGS. 5A and 5B is that the number of WUS sequences alternating among different alternating cycles is 8 in FIG. 5A, while the number of WUS sequences alternating among different alternating cycles is 4 in FIG. 5B.

In the embodiments according to FIGS. 5A and 5B, a WUS sequence index or a UE group ID for the UE may be determined based on the following parameters: an index of the initial WUS sequence for the UE, the number of WUS sequences alternating in a dedicated location in time domain, the system frame number (SFN), the hyper SFN, and the cell-specific discontinuous reception (DRX) cycle. For example, the WUS sequence index or a UE group ID for the UE may be determined based on the following equation:

$$x = \left( N_{index}^{WUS} + size \cdot \left\lfloor \frac{F(SFN, \text{Hyper } SFN)}{T} \right\rfloor + \text{offset} \right) \bmod M_{total}^{Groups} \quad (1)$$

$$x = \left( N_{index}^{WUS} + size \cdot \left\lfloor \frac{F(SFN, \text{Hyper } SFN)}{T + \text{offset}} \right\rfloor \right) \bmod M_{total}^{Groups} \quad (2)$$

wherein:

"x" is the WUS sequence index or UE group ID;

"size" is the number of WUS sequences alternating in a dedicated location in time domain, wherein there will be no WUS sequence alternating in the case that "size" is 0;

F(SFN, Hyper SFN) is a function of SFN and Hyper SFN that may be expressed as SFN/T, Hyper SFN/T, or (1024*Hyper SFN+SFN)/T, wherein SFN is a system frame number and Hyper SFN is a hyper system frame number (SFN);

"T" is a) an alternating cycle associated with cell-specific discontinuous reception (DRX) cycle, and may be at least one of nT', T', T'/2, T'/4, and T'/m, wherein T' is a cell-specific DRX cycle or a value configured by network side or pre-configured, n and m are nature integers;

b) an alternating cycle associated with at least one of cell-specific DRX and UE-specific DRX cycle; or c) one of LCM(T', T"), max(T', T"), GCD (T', T"), or min(T', T"), wherein LCM is the lowest common multiple option, GCD is the greatest common divisor option, T' is a cell-specific DRX cycle or a value configured by network side or pre-configured, T" is a UE-specific DRX cycle or a value configured by network side or pre-configured;

"offset" is optional to accelerate or change the alternating frequency in an alternating cycle; and $N_{index}^{WUS}$ is an index of the initial WUS sequence.

In some embodiments of the present application, the parameters in Equation (1) or Equation (2) may be configured by the network side, e.g., a BS. In some other embodiments, the parameters in Equation (1) or Equation (2) may be computed based on the WUS configuration information.

According to some embodiments of the present application, the optional "offset" in Equation (1) or Equation (2) may be associated with a) the time information of PO, or the time information of a WUS resource or a WUS sequence; and/or b) a UE DRX cycle. For example, the time information of PO, or the time information of a WUS resource or a WUS sequence can be a SFN of a PO, a WUS resource or a WUS sequence. In the case that the SFN of a PO, a WUS resource or a WUS sequence is even, the time offset can be n; while in the case that the SFN of the PO, the WUS resource or the WUS sequence is odd, the time offset can be m, wherein n and m are different nature integers.

According to some embodiments of the present application, the "offset" may be associated with paging probability group ID information for paging probability information based grouping and/or UE group ID information. The "offset" may be defined by the formulation:

$$size1 * \frac{F(SFN, \text{Hyper } SFN)}{T'''},$$

wherein "size1" is the number of WUS sequences alternating in a dedicated location in time domain, T''' is associated with a cycle smaller than T, and T''' may be $$\frac{T}{K},$$

wherein "K" is a nature integer or associated with a UE DRX cycle.

According to some other embodiments of the present application, the optional offset in Equation (1) or Equation (2) may be associated with the UE group information for paging probability based grouping and/or UE-ID based grouping. For example, in the case that the UE group ID for paging probability based grouping and/or UE-ID based grouping is equivalent to n, offset may be equivalent to 1.

For the alternation of WUS sequences according to some embodiments of the present application, the pattern of the WUS sequence mapping per gap type may be as shown in Table 2:

TABLE 2

| 0 | 1 | 2 | ... | G-1 |
|---|---|---|-----|-----|
| X0, | X1 | X2 | ... | X(G-1) |

In Table 2, X0, X1, X2, . . . , X(G−1) may include a number set {0,1, 2, . . . G}, wherein G is the number of the WUS sequences.

For example, as shown in FIG. 5A, there are two WUS resources having two time periods t1 and t2 (or, t1' and t2') respectively within each alternating cycle T, wherein the WUS sequences (8, 9, 10, 11) and (12, 13, 14, 15) in the time period t1 will be alternated into the time period t2' as the WUS sequences (8, 9, 10, 11, 12, 13, 14, 15) after an alternating cycle T, and the WUS sequences (0, 1, 2, 3, 4, 5, 6, 7) in the time period t2 will be alternated into the time periods t1' as the WUS sequences (0, 1, 2, 3) and (4, 5, 6, 7) after this alternating cycle T. Similarly, as shown in FIG. 5B, there are two WUS resources having two time periods t1 and t2 (or, t1' and t2') respectively within each alternating cycle T, wherein the WUS sequences (8, 9) and (10, 11) in the time period t1 and the WUS sequences (4, 5, 6, 7) in the time period t2 will be alternated into the time period t2' as the WUS sequences (8, 9, 10, 11, 4, 5, 6, 7) after an alternating cycle T, and the WUS sequences (0, 1, 2, 3) in the time period t2 will be alternated into the time periods t1' as the WUS sequences (2, 3) and (0, 1) after this alternating cycle T. Here, the WUS sequence(n) means the WUS sequence mod(n, 8) in the relative WUS resource, n is integer.

Figure 6:
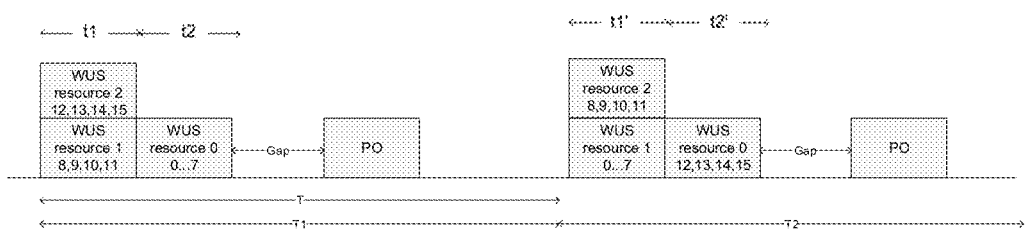
FIG. 6 illustrates an exemplary alternation of WUS resources according to some embodiments of the present application.

FIG. 6 illustrates an exemplary alternation of WUS resources according to some embodiments of the present application, wherein the WUS resources can alternate in a dedicated location in time domain. As shown in FIG. 6, in the case that the WUS resources alternate based on a step size and an alternating cycle. The alternating cycle could be T, or T+offset, or the cycle associated with offset. The WUS sequences in WUS resource n in the first time period T1 will move to the WUS resource n+1 in the second time period T2. All the sequence in WUS resource n will totally move to the WUS resourcen+1 in the second time period T2.

According to some embodiments of the present application, a WUS resource index for a UE may be determined based on the following parameters: an initial WUS resource index for the UE, the number of WUS resources alternating in a dedicated location in time domain, the system frame number (SFN), the hyper SFN, and a cell-specific discontinuous reception (DRX) cycle. For example, the WUS resource index for the UE may be determined based on the following equation:

$$WUS_{index}^{resource} = \left(WUS_{index} + \text{size} * \left\lfloor \frac{F(SFN, \text{Hyper } SFN)}{T} \right\rfloor + \text{offset}\right) \bmod N_{WUS} \quad (3)$$

-continued or $$WUS_{index}^{resource} = \left(WUS_{index} + size * \left\lfloor\frac{F(SFN, \text{Hyper } SFN)}{T + \text{offset}}\right\rfloor\right) \bmod N_{WUS} \quad (4)$$

wherein
$WUS_{index}^{resource}$ is the WUS resource index;
$WUS_{index}$ is an index of the initial WUS resource;
"size" is the number of WUS resources alternating in a dedicated location in time domain, wherein there will be no WUS sequence alternating or WUS resource alternating in the case that "size" is 0;
F(SFN, Hyper SFN) is a function of SFN and Hyper SFN that may be expressed as SFN/T, Hyper SFN/T, or (1024*Hyper SFN+SFN)/T, wherein SFN is a system frame number and Hyper SFN is a hyper system frame number;
"T" is a) an alternating cycle associated with cell-specific discontinuous reception (DRX) cycle, which may be at least one of nT', T', T'/2, T'/4, and T'/m, wherein T' is a cell-specific DRX cycle or a value configured by network side or pre-configured, n and m are nature integer;
b) an alternating cycle associated with at least one of cell-specific DRX and UE-specific DRX cycle; or
c) one of LCM(T', T"), max(T', T"), GCD (T', T"), or min(T', T"), wherein LCM is the lowest common multiple option, GCD is the greatest common divisor option, T' is a cell-specific DRX cycle or a value configured by network side or pre-configured, T" is a UE-specific DRX cycle or a value configured by network side or pre-configured;
"offset" is optional to accelerate the alternating frequency in an alternating cycle; and
$N_{WUS}$ is the number or sum of WUS resources. It may be 0, 1, or 2 for NB-IoT and 0, 1, 2, 3, or 4 for enhanced Machine Type Communication (eMTC).

In some embodiments of the present application, the parameters in Equation (3) or Equation (4) may be configured by the network side, e.g., a BS. In some other embodiment, the parameters in Equation (3) or Equation (4) may be computed based on the WUS configuration information.

According to some embodiments of the present application, the optional offset in Equation (3) and Equation (4) may be associated with a) the time information of PO, or the time information of a WUS resource or a WUS sequence; and/or a UE DRX cycle. For example, the time information of PO, or the time information of a WUS resource or a WUS sequence can be a SFN of a PO, a WUS resource or a WUS sequence. In the case that the SFN of a PO, a WUS resource or a WUS sequence is even, the time offset can be n; while in the case that the SFN of the PO, the WUS resource or the WUS sequence is odd, the time offset can be m, wherein n and m are different nature integers. For example, in the case that the SFN of PO is even, "offset" may be equivalent to n, while in the case that the SFN of PO is odd, "offset" may be equivalent to n+1.

According to some embodiments of the present application, the "offset" may be associated with paging probability group ID information for paging probability information based grouping and/or UE group ID information for UE-ID based grouping. The "offset" may be defined by the formulation:

$$size1 * \frac{F(SFN, \text{Hyper } SFN)}{T'''},$$

wherein "size1" is the number of WUS resource alternating in a dedicated location in time domain, T"' is associated with a cycle smaller than T, and T"' may be $$\frac{T}{K},$$

wherein "K" is a nature integer or associated with a UE DRX cycle.

For the alternation of WUS sequences according to some embodiments of the present application, the pattern of the WUS sequence mapping per gap type may be as shown in Table 3:

TABLE 3

| 0 | 1 | 2 | ... | G |
|---|---|---|---|---|
| X0, | X1 | X2 | ... | X(G-1) |

In Table 3, X0, X1, X2, ..., X(G−1) may include the number set {0,1}, {0,1,2}, or {0,1,2,3}, wherein G is the number of the WUS sequences.

For example, as shown in FIG. 6, there are two WUS resources having two time periods t1 and t2 (or, t1' and t2') respectively within each alternating cycle T, wherein the WUS sequences (12, 13, 14, 15) in the time period t1 will be alternated into the time period t2' after an alternating cycle T, and the WUS sequences (0, 1, 2, 3, 4, 5, 6, 7) in the time period t2 will be alternated into the time periods t1' after this alternating cycle T.

Figure 7:
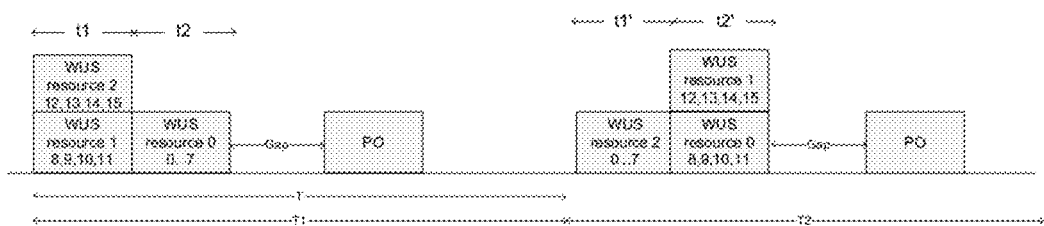
FIG. 7 illustrates another exemplary alternation of WUS resources according to some other embodiments of the present application.

FIG. 7 illustrates another exemplary alternation of WUS resources according to some other embodiments of the present application.

The alternation manner of WUS resources is different from that shown in FIG. 6. In FIG. 7, a plurality of WUS resources in different time locations will alternate their locations in time domain among different alternating cycles, such that each WUS resource will move to an adjacent time resource together with its WUS sequences. In this case, the WUS alternating information may mirror two adjacent WUS resource sets in time domain per gap type. However, although the specific alternation manners in FIGS. 6 and 7 are different, a WUS resource index for a UE may be determined based on the same way as that in FIG. 6, which will not be repeated.

Specifically, as shown in FIG. 7, there are three WUS resources having two time periods t1 and t2 (or, t1' and t2') respectively within each alternating cycle T, wherein the WUS sequences (8, 9, 10, 11) and (12, 13, 14, 15) in the time period t1 will be alternated into the time period t2' after an alternating cycle T, and the WUS sequences (0, 1, 2, 3, 4, 5, 6, 7) in the time period t2 will be alternated into the time periods t1' after this alternating cycle T, such that the WUS resources in the time period t1 can be mirrored as the WUS resources in the time period t2' and the WUS resources in the time period t2 can be mirrored as the WUS resources in the time period t1'.

Figure 8:
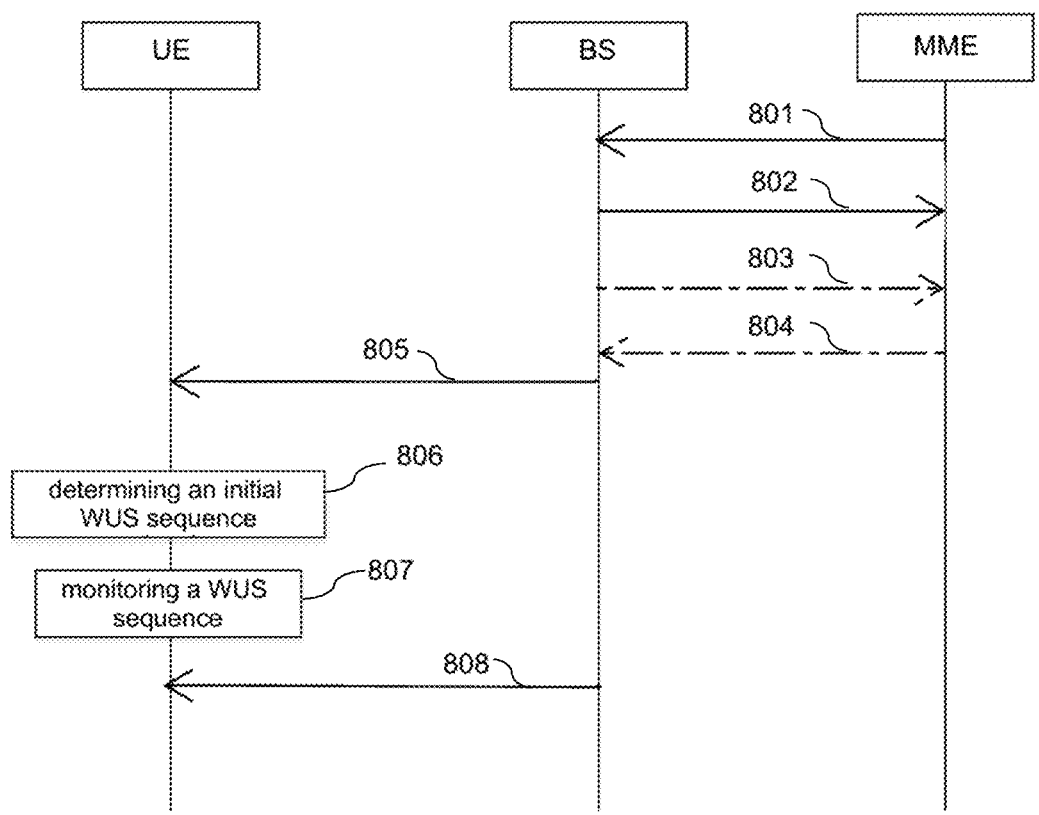
FIG. 8 illustrates an exemplary WUS detection procedure in a wireless communication system according to some embodiments of the present application.

FIG. 8 illustrates an exemplary WUS detection procedure in a wireless communication system according to some embodiments of the present application.

According to some embodiments of the present application, an MME may determine UE distribution information per at least one of gap type and carrier. For example, the MME may determine UE distribution information per at least one of gap type and carrier, e.g., per gap type, per carrier, or per gap type and carrier. According to some embodiments of the present application, the UE distribution information can indicate whether an MME will page a UE not configured with paging probability information or a UE only used for UE-ID based grouping. For example, an MME can determine the paging probability information of UEs, which can be collected which can be collected from an operation administration and maintenance (OAM). The MME can transmit the UE distribution information to a BS step 801. The UE distribution information is associated with the gap type (e.g., DRX gap, or eDRX gap; or DRX gap, eDRX short gap, or eDRX long gap). The UE distribution information can be transmitted from the MME to the BS by S1 message, so that the BS can map the UE into different WUS groups. Furthermore, the UE DRX gap information may also be notified to the MME by the BS or UE via a non-access stratum (NAS) procedure for the UE and MME or over a S1 interface for the BS and MME. All the messages communicated between the BS and MME can be in cell-level. After receiving the UE distribution information, the BS will record and store the UE distribution information, e.g., paging probability information, so that it can determine grouping rule information based on the UE distribution on the paging probability. In step 802, the BS may send an acknowledgement (ACK) to the MME, which may with the information of the number of UE groups.

According to some other embodiments of the present application, in step 803, a BS may voluntarily transfer UE group information supported in the BS for WUS in the RAN side. The UE group information transferred from the BS can allow the MME to determine the paging probability group zone on the UE distribution. The UE group information may be indicated to the number of WUS sequence information.

In step 804, the MME may send ACK information to the BS in response to the UE group information received in step 803. The MME may also provide a suggested number of UE groups in the RAN side, wherein the suggested number of UE groups is per at least one gap and per carrier. The suggested number of UE groups may be used for at least one of UE-ID based grouping, paging probability information based grouping, or the combination of the UE-ID based grouping and paging probability information based grouping. Persons skilled in the art should understand that Steps 801 and 802 may not necessarily be continuous to Steps 803 and 804. The suggested number of UE groups may be common information for at least one of gap type and carrier. According to some embodiments of the present application, the MME may notify the base station that the UE distribution information is updated. For example, the MME may notify the changing of UE distribution to the base station over the S1 interface between the BS and MME.

According to some yet other embodiments of the present application, the BS may transmit the WUS configuration to the UE in step 805. For example, the BS may transmit the WUS configuration by SIB information or by paging message. The WUS configuration information may include the paging probability information for UE grouping.

In step 806, the UE may determine an initial WUS sequence based on the grouping rule and the grouping parameter. The grouping rule may be UE-ID based grouping, paging probability based grouping, or the combination thereof.

In step 807, the UE may detect the WUS prior to each associated PO. In the case that the WUS is detected, the UE will monitor the PO. Otherwise, the UE will not monitor the associated PO to save power.

In step 808, the BS may page the UE with indication information. Persons skilled in the art should understand that step 805 may not necessarily be continuous to step 808.

More details on the information transmitted during the procedure will be illustrated hereafter.

According to some embodiments of the present application, the UE group information may include a maximum number of UE groups per gap, a number of the UE groups per gap applied in the BS, or a number of carriers for grouping UEs. The maximum number of UE groups per gap can be common information for carriers, or the number of the UE groups per gap applied in the BS could be common information for carriers. The manner of grouping UEs may be at least one of UE-ID based grouping, paging probability information based grouping, or the combination of the paging probability information based grouping and UE-ID based grouping. For example, under the paging probability information based grouping, in the case that there are eight UE groups for each one of two WUS resources for a PO, sixteen UE groups can be used for WUS detection and the MME can provide the UE number information on the sixteen paging probability zones from 0 to 1.

According to some embodiments of the present application, the MME may provide suggested UE group information for grouping UEs to a BS, including at least one of a maximum number of UE groups per gap, a number of the UE groups per gap applied in the BS, a number of carriers for grouping UEs. Similarly, the maximum number of UE groups per gap could be common information for carriers, or the number of the UE groups per gap applied in the BS could be common information for carriers.

According to some embodiments of the present application, the number of UE groups may include the number of the group for UE-ID based grouping, the group for paging probability information based grouping, or the group for the two level grouping. For example, in the case of the number of UE groups indicating the group for the two level grouping, according to the number of UE groups, the UEs will be first grouped based on its paging probability information and then grouped based on its own UE ID.

The paging probability information based grouping may include the grouping rule based on paging probability information. The paging probability information based grouping may include the two level grouping, where the UE will be grouped based on its paging probability and then grouped based on its own UE ID. For example, when the UE group 0-3 is for paging probability zone from 0 to 0.2, the UE with paging probability value 0.1 will apply the WUS sequence for UE group 0 if its value based on the UE-ID based grouping formulation is 0, and the formulation, for example, may be mode(UE-ID, 4)=0.

According to some embodiments of the present application, the UE distribution information indicates at least one paging probability information zone and number of UEs in each o paging probability information zone, the paging probability information zone is per at least one of gap type and carrier.

In some embodiments of the present application, the UE distribution information indicates whether a mobility management entity (MME) will page a UE not configured with paging probability information or a UE only for UE-ID based grouping. UE distribution information indicates at least one of the number of UEs only for UE-ID based grouping, the number of UEs not configured with paging probability information, the percent of UEs only for UE-ID based grouping, the percent of UEs not configured with paging probability information, the number of UEs configured with paging probability information, and the percent of UEs configured with paging probability information. The number of UE only for UE-ID based grouping, the number of UE not configured with paging probability information, the percent of UE only for UE-ID based grouping, the percent of UE not configured with paging probability information, the number of UE configured with paging probability information, or the percent of UE configured with paging probability information could be at least one of per gap type and per carrier. The number of UE only for UE-ID based grouping, the number of UE not configured with paging probability information, the percent of UE only for UE-ID based grouping, the percent of UE not configured with paging probability information, the number of UE configured with paging probability information, or the percent of UE configured with paging probability information could be per eNB. The percent information is associated to the number of UE paged by eNB. The percent information is associated to the number of UE paged on at least one of per gap type and per carrier. The percent information also could be expressed to indicate that whether the number of UE or the percent of UE exceeds a threshold. The UE distribution information could include at least one of the UE distribution information for UE only for UE-ID based grouping, and UE distribution information for UE not configured with paging probability information. The UE distribution information could include at least the UE distribution information for UE configured with paging probability information. The UE distribution information could be per gap type, per carrier, or per gap type and carrier. The UE distribution information could be per eNB.

According to some other embodiments of the present application, the UE distribution information indicates at least one of paging probability information zone and a percent of UEs in each of the at least one paging probability information zone, the paging probability information zone is per at least one gap type and per carrier. The paging probability information zone may be common information to at least one of gap type and carrier.

According to some other embodiments of the present application, the UE distribution information indicates a total number of UEs in all paging probability information zones, or a number of UEs in one paging probability information zone, wherein the paging probability information zone is per at least one gap type and per carrier. The paging probability information zone may be common information to at least one of gap type or carrier. A paging probability information zone can be a paging probability zone indicating a paging probability range or a paging probability group zone indicating a range of paging probability groups. For example, the paging probability zone indicates the paging probability ranged from 0 to 0.2, or the paging probability group zone indicates that the paging probability group1-n belongs to zone 1.

In some embodiments of the present application, the UE distribution information may be associated with time information, wherein the time information could be a timer, a time range, a time period or a time duration.

According to some embodiments of the present application, the UE may receive paging probability threshold information from a BS, which can be used for grouping UEs and reducing the size of parameters on paging probability threshold. The paging probability threshold information may include a minimum threshold, a maximum threshold, and a step size. In some embodiments, the paging probability threshold information may also include a ratio of each threshold zone to the step size.

For example, the parameter for each gap type could be: the minimum value is 0.03, the maximum value is 0.92, the step size is 0.2, and the value of each threshold to the step size is 1, 1, 2 and remaining part. Accordingly, the thresholds for each paging probability group may be 0.03-0.23, 0.23-0.43, 0.43-0.83, 0.83-0.92. Then, the UE can find its group ID based on these thresholds.

According to some embodiments of the present application, the paging probability threshold information may be per gap type, per carrier, and per gap type and carrier. The paging probability threshold information could be common to at least one of gap type or carrier.

According to some embodiments of the present application, a WUS sequence index for the UE can be determined based on a WUS resource index for the UE and a WUS sequence in a WUS resource identified by the WUS resource index. In this case, all WUS sequences in the WUS resource for UE grouping will be alternated.

According to some embodiments of the present application, paging probability threshold information for one gap type may be determined by referring to the paging probability threshold information for another gap type. In the case that the eDRX long gap is configured but no group WUS configuration on grouping for that gap is provided, the eDRX short gap configuration on grouping shall be used if it has been configured; otherwise, the DRX configuration on grouping shall be used. In the case that the eDRX short gap is configured but no group WUS configuration on grouping for that gap is provided, the DRX gap configuration on grouping shall be used. In the WUS configuration on grouping, the grouping parameter may be at least one of paging probability threshold information and UE group ID information for UE-ID based grouping. In the WUS configuration on grouping, the grouping parameter may be at least one of the WUS sequence information for paging probability information based grouping and WUS sequence for UE-ID based grouping. In the WUS configuration on UE grouping, the grouping parameter may be at least one of the WUS group information for paging probability information based grouping and WUS group information for UE-ID based grouping. For example, for DRX gap, the WUS group 0-1 is for UE-ID based grouping, and the WUS group 2-15 is for paging probability information based grouping. Furthermore, the WUS group 2-4 is for the paging probability in (0, 0.1), the WUS group 4-7 is for the paging probability is (0.1, 0.6), and the WUS group 7-15 is for the paging probability in [0.6, 1]. The UE could get its WUS group based on UE-ID based grouping in the group set for a dedicated paging probability information.

According to some other embodiments of the present application, in the case that the two gap types have the same WUS resource and sequence configuration, paging probability threshold information for one gap type may be determined by referring to paging probability threshold information for another gap type. The WUS sequence information for paging probability information based grouping and WUS sequence for UE-ID based grouping for one gap may be determined by referring to the WUS sequence information for paging probability information based grouping and WUS sequence for UE-ID based grouping for another gap. The WUS group information for paging probability information based grouping for one gap may be determined by referring to the WUS group information for paging probability information based grouping for another gap. The WUS group information for UE-ID based grouping for one gap may be determined by referring to the WUS group information for UE-ID based grouping for another gap.

The WUS group information for paging probability information based grouping for one gap on a carrier may be determined by referring to the WUS group information for paging probability information based grouping for the same gap type on another carrier. Another carrier may be indicated by the BS or primary cell. The WUS group information for UE-ID based grouping for one gap on a carrier may be determined by referring to the WUS group information for UE-ID based grouping for the same gap type on another carrier. Another carrier may be indicated by the BS, the preconfigured UE, the carrier of primary cell, or the primary cell. The WUS group information could be corresponding to the WUS sequence information.

The paging probability threshold information for one gap type on a carrier may be determined by referring to the paging probability threshold information for the same gap type on another carrier. Another carrier could be indicated by the BS, the carrier of primary cell, or the primary carrier.

Generally, the UE with different grouping rule, such as UE-ID based grouping, paging probability information based grouping, or combination of them, will apply different WUS sequences for grouping. However, in some cases, the WUS resource is limited, and thus the WUS sequences in each WUS resource are also limited. For UE-ID based grouping, if the number of UE applying UE-ID based grouping rule is small, it is possible that these UEs could apply the group WUS for paging probability information grouping or combination of paging probability information grouping and UE-ID based grouping, because the UE in highest paging probability will paged frequently and thus the wrong paging alarming of UE in highest paging probability group caused by introducing UE-ID based UE is small. Besides, in the case that the number of UE in a dedicated paging probability group is small, the UE for UE-ID based grouping could share this WUS sequence for this dedicated paging probability group, the wrong paging alarming of UE in the dedicated paging probability group caused by introducing UE-ID based UE is small. Accordingly, it is possible that the BS configures UE with the UE-ID based grouping rule or the UE not configured paging probability information could apply one or more WUS resource and or WUS sequence for dedicated paging probability information. The UE in this paging probability information group could continue to apply the UE-ID based grouping if the WUS sequence for this paging probability information is more than one. Alternatively, the UE will be configured with only one WUS sequence associated to dedicated paging probability information. According to some embodiments of the present application, the WUS sequence for UE-ID based grouping may include WUS sequence only for UE-ID based grouping, or include WUS sequences only for UE-ID based grouping and the WUS sequence for paging probability information based grouping. The WUS sequences only for UE-ID based grouping may be one or more. The WUS sequences for paging probability information based grouping may be one or more. In an embodiment of the present application, the paging probability information based grouping may include a further UE-ID based grouping.

Figure 9:
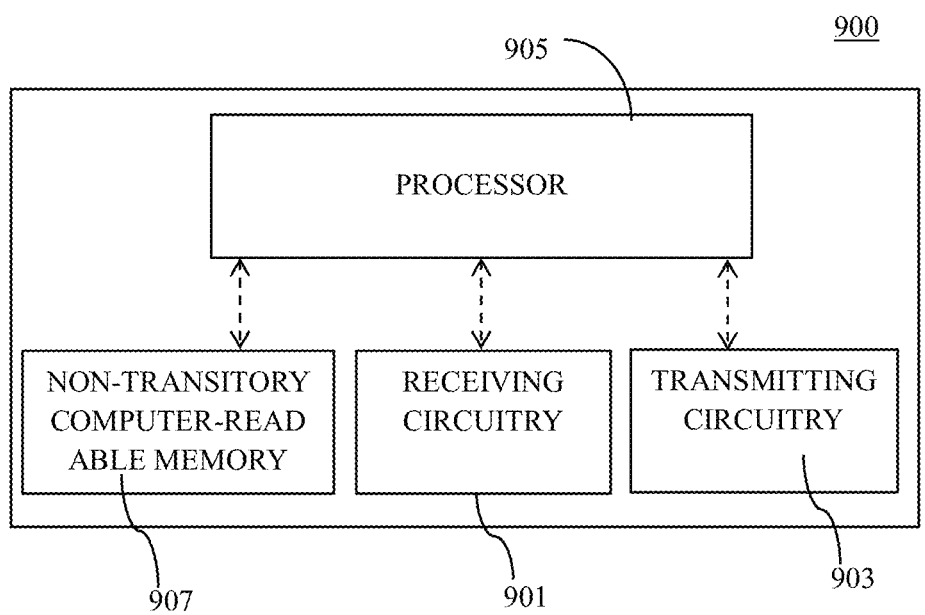
FIG. 9 illustrates a block diagram of an apparatus according to some embodiments of the present application.

FIG. 9 illustrates a block diagram of an apparatus according to some embodiments of the present application. In some embodiments of the present application, the apparatus 900 may be a BS as illustrated in above embodiments of the present application. In some other embodiments of the present application, the apparatus 900 may be an MME as illustrated in above embodiments of the present application. In some yet other embodiments of the present application, the apparatus 900 may be a UE as illustrated in above embodiments of the present application.

As shown in FIG. 9, the apparatus 900 may include at least one receiving circuitry, e.g., a receiver 901, at least one transmitting circuitry, e.g., a transmitter 903, a processer 905, and a non-transitory computer-readable medium 907. The non-transitory computer-readable medium 907 has computer executable instructions stored therein. The processer 905 is configured to be coupled to the non-transitory computer readable medium 907, the receiving circuitry 901, and the transmitting circuitry 903. It is contemplated that the apparatus 900 may include more computer-readable mediums, receivers, transmitters and processors in some other embodiments of the present application according to practical requirements. In some embodiments of the present application, the receiving circuitry 901 and the transmitting circuitry 903 are integrated into a single device, such as a transceiver. In certain embodiments, the apparatus 900 may further include an input device, a memory, and/or other components.

In some embodiments of the present application, the non-transitory computer-readable medium 907 may have stored thereon computer-executable instructions to cause a processor to implement the method according to embodiments of the present application.

For a NAS procedure in some embodiments of the present application, it can be at least one of a TA updating procedure and attach procedure.

For the information transmitted from an MME to an eNB in embodiments of the present application, it can be over at least one of the messages: MME CONFIGURATION UPDATE, MME CONFIGURATION TRANSFER, MME DIRECT INFORMATION TRANSFER, and ENB CONFIGURATION UPDATE ACKNOWLEDGE.

For the information transmitted from the eNB to the MME in embodiments of the present application, it can be over at least one of the messages: eNB CONFIGURATION UPDATE, eNB CONFIGURATION TRANSFER, eNB DIRECT INFORMATION TRANSFER, and MME CONFIGURATION UPDATE ACKNOWLEDGE.

For the information transmitted or received in embodiments of the present application on eNB level or at eNB side can also be the information on cell level. It is commonly understood by the specification.

Persons skilled in the art should understand that as the technology develops and advances, the terminologies described in the present application may change, and should not affect or limit the principle and spirit of the present application.

The method according to embodiments of this application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this application.

While this application has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed:

1. A method performed by a user equipment (UE), the method comprising:
   receiving a wake-up signal (WUS) configuration information including UE grouping information and WUS alternating information, the UE grouping information including UE-ID based grouping information and a paging probability information indicating at least one of a minimum paging probability threshold, a maximum paging probability threshold, or a paging probability threshold step size;
   determining the paging probability threshold information for a first DRX (discontinuous reception) gap type by referring to a common paging probability threshold information common for all types of DRX gap types of a WUS resource;
   determining an initial WUS sequence based on the UE grouping information and the paging probability threshold information for the first gap type; and
   monitoring a WUS sequence based on the initial WUS sequence and the WUS alternating information.

2. The method of claim 1, wherein the WUS alternating information comprises size information, and wherein the size information indicates a number of WUS sequences alternating in a dedicated location in a time domain or a number of WUS resources alternating in a dedicated location in the time domain.

3. The method of claim 2, wherein the size information is for alternating the WUS sequence and comprises one of:
   a value configured by network side from a value range,
   a default value equivalent to 1; and
   a minimum of $$\left(\sum\nolimits_{j=1}^{j=J} n_{i,j}, \sum\nolimits_{j'=1}^{j'=J'} n_{i',j'}\right),$$

wherein $n^{i,j}$ is a number of WUS sequences at a WUS resource with the time domain and a frequency domain value, and i is a time resource index and j is a frequency resource index, and wherein $n_{i',j'}$ is a number of WUS sequences at a WUS resource with a time domain and frequency domain value, and i' is a time resource index and j' is a frequency resource index.

4. A user equipment (UE) for wireless communication, comprising: at least one memory; and
   at least one processor coupled with the at least one memory and configured to cause the UE to:
   receive a wake-up signal (WUS) configuration information including UE grouping information and WUS alternating information, the UE grouping information including UE-ID based grouping information and a paging probability information indicating at least one of a minimum paging probability threshold, a maximum paging probability threshold, or a paging probability threshold step size;
   determine the paging probability threshold information for a first DRX (discontinuous reception) gap type by referring to a common paging probability threshold information common for all types of DRX gap types of a WUS resource;
   determine an initial WUS sequence based on the UE grouping information and the paging probability threshold information for the first gap type; and
   monitor a WUS sequence based on the initial WUS sequence and the WUS alternating information.

5. A base station for wireless communication, comprising: at least one memory; and
   least one processor coupled with the at least one memory and configured to cause the base station to:
   determine a wake up signal (WUS) configuration information including UE grouping information and WUS alternating information, the UE group information including UE-ID base grouping information and a paging probability threshold information indicating at least one of a minimum paging probability threshold, a maximum paging probability threshold, or a paging probability threshold step size,
   wherein the paging probability threshold information for a first DRX (discontinuous reception) gap type is determined by referring to a common paging probability threshold information common for all types of DRX gap types of a WUS resource; and
   transmit the WUS configuration information for a WUS to enable a UE to monitor a WUS sequence based on an initial WUS sequence determined using at least the UE grouping information and the paging probability information.

6. The UE of claim 4, wherein the WUS alternating information indicates to mirror two adjacent WUS resource sets in time domain per DRX gap type.

7. The UE of claim 4, wherein the WUS alternating information comprises an alternating cycle associated with cell-specific DRX.

8. The UE of claim 7, wherein the alternating cycle associated with cell-specific DRX is at least one of nT', T', T'/2, T'/4, and T'/m, wherein T' is a cell-specific DRX cycle or a value configured by network side or pre-configured, n and m are nature integer.

9. The UE of claim 4, wherein the WUS alternating information comprises an offset associated with time information of paging occasion (PO), the time information of a WUS resource or a WUS sequence, and/or UE DRX cycle.

10. The UE of claim 9, wherein:
   if a system frame number (SFN) of the PO, the WUS resource or the WUS sequence is even, the time offset is n; and if the SFN of the PO, the WUS resource or the WUS sequence is odd, the time offset is m, wherein n and m are different nature integers.

11. The UE of claim 4, wherein the UE grouping information is per DRX gap type, per carrier or per DRX gap type and per carrier.

12. The UE of claim 4, wherein the first DRX gap type is on a first carrier, and wherein, to determine the paging probability information for the first DRX gap type, the at least one processor is further configured to cause the UE to refer to a common paging probability threshold information for a same DRX gap type on a second carrier.

13. The UE of claim 4, wherein the at least one processor is further configured to cause the UE to determine WUS group information for paging probability information-based grouping for one DRX gap type on a carrier by referring to the WUS group information for paging probability information-based grouping for a same DRX gap type on another carrier.

14. The UE of claim 4, wherein all gap types having the WUS resource have a same sequence configuration.

15. The UE of claim 4, wherein the referring to the common paging probability information is based at least in part on the paging probability information for the first gap type being unconfigured.

16. The UE of claim 4, wherein the at least one processor is further configured to cause the UE to: receive at least one of a group ID, a group ID set, or a WUS sequence information for paging probability information-based grouping; and use the received group ID, the received group ID set, or the received WUS sequence information to perform UE-ID based grouping.

17. The UE of claim 12, wherein the second carrier is preconfigured or indicated by a network, or is a carrier of a primary cell or an anchor carrier.

18. A processor for wireless communication, comprising:
at least one controller coupled with at least one memory and configured to cause the processor to:
receive a wake-up signal (WUS) configuration information including UE grouping information and WUS alternating information, the UE grouping information including UE-ID based grouping information and a paging probability information indicating at least one of a minimum paging probability threshold, a maximum paging probability threshold, or a paging probability threshold step size;
determine the paging probability threshold information for a first DRX (discontinuous reception) gap type by referring to a common paging probability threshold information common for all types of DRX gap types of a WUS resource;
determine an initial WUS sequence based on the UE grouping information and the paging probability threshold information for the first gap type; and
monitor a WUS sequence based on the initial WUS sequence and the WUS alternating information.

19. The UE of claim 4, wherein the referring to the common paging probability information is based at least in part on the paging probability information for the first gap type being unconfigured.

* * * * *